United States Patent
Birnbaum et al.

(10) Patent No.: US 9,357,495 B2
(45) Date of Patent: May 31, 2016

(54) SYSTEMS AND METHODS FOR DYNAMICALLY ALLOCATING POWER BUDGETS FOR OPERATION OF WIRELESS MODULES

(71) Applicants: David Birnbaum, Modiin (IL); Ofir Artstain, Natania (IL); Michael Glik, Kfar Saba (IL); Roi Sadan, Aviel (IL); Vasudevan Srinivasan, Hillsboro, OR (US)

(72) Inventors: David Birnbaum, Modiin (IL); Ofir Artstain, Natania (IL); Michael Glik, Kfar Saba (IL); Roi Sadan, Aviel (IL); Vasudevan Srinivasan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 100 days.

(21) Appl. No.: 14/139,942

(22) Filed: Dec. 24, 2013

(65) Prior Publication Data
US 2015/0181529 A1    Jun. 25, 2015

(51) Int. Cl.
G08C 17/00    (2006.01)
H04W 52/02   (2009.01)

(52) U.S. Cl.
CPC ............ H04W 52/0261 (2013.01); *Y02B 60/50* (2013.01)

(58) Field of Classification Search
CPC .. H04B 7/0456; H04W 16/14; H04W 52/146; H04W 52/367; Y02B 60/50
USPC ......................................................... 370/311
See application file for complete search history.

(56) References Cited

U.S. PATENT DOCUMENTS

| | | | |
|---|---|---|---|
| 2008/0253351 A1* | 10/2008 | Pernu et al. ................... | 370/345 |
| 2010/0157895 A1* | 6/2010 | Pani et al. ..................... | 370/328 |
| 2011/0081936 A1* | 4/2011 | Haim et al. ................... | 455/522 |
| 2011/0300805 A1* | 12/2011 | Gaikwad et al. ............. | 455/63.1 |

* cited by examiner

*Primary Examiner* — Gregory Sefcheck
*Assistant Examiner* — Majid Esmaeilian
(74) *Attorney, Agent, or Firm* — Sutherland Asbill & Brennan LLP

(57) ABSTRACT

Certain embodiments herein relate to dynamic allocation of power budgets for wireless modules that may be integrated onto a wireless combo module. An individual power budget for each wireless module may be modified based on the performance of the wireless module such that wireless modules that may benefit from additional power consumption may receive additional power budget from other wireless modules that may be consuming less power than currently allocated. In this way, power budgets may be cooperatively shared among wireless modules to facilitate optimized wireless communications. Various techniques may be used to configure a wireless module to operate within or at certain power values, including adjusting a transmission speed and/or a time interval for sending backoffs to attain a desired power consumption.

21 Claims, 4 Drawing Sheets

SYSTEMS AND METHODS FOR DYNAMICALLY ALLOCATING POWER BUDGETS FOR OPERATION OF WIRELESS MODULES

BACKGROUND

Increasingly, devices such as notebooks, tablets, or other processor-based devices are being manufactured without fans or simple cooling mechanisms to dissipate heat generated by components operating in these devices. Manufacturers have addressed the potential for overheating that may be prevalent in such devices by limiting the performance of various components, such as wireless components. As a result, users of these devices may experience poor or inadequate performance for wireless communications or other features.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Certain embodiments herein relate to, among other things, dynamic allocation of power budgets for wireless modules. A wireless module may configure a device in which it resides to send and/or receive wireless communications with other devices. For example, a WiFi module may send and/or receive WiFi signals, a WiGig module may send and/or receive WiGig signals, and other wireless modules may send and/or receive wireless signals according to other standards. A combination of such wireless modules may be integrated onto, grouped, or otherwise associated with a wireless combo module. By virtue of such association, resources available to the wireless combo module may be shared among associated wireless modules. For example, the wireless combo module may have a total power budget beyond which the wireless modules, alone or in combination, may not consume. An individual power budget for each wireless module may be modified based on the performance of the wireless module such that wireless modules that may benefit from additional power consumption may receive additional power budget from other wireless modules that may be consuming less power than currently allocated. In this way, power budgets may be cooperatively shared among wireless modules to facilitate optimized wireless communications.

Various techniques may be used to configure a wireless module to operate within or at certain power values. For example, a transmission speed for data packets and/or a time interval at which a backoff is sent may be adjusted to attain a certain power consumption value. The value of such parameters may be predetermined, in one embodiment, such that systems and methods herein may access such values and configure a device to operate according to the desired power consumption. Examples of the above descriptions are provided below.

Figure 1:
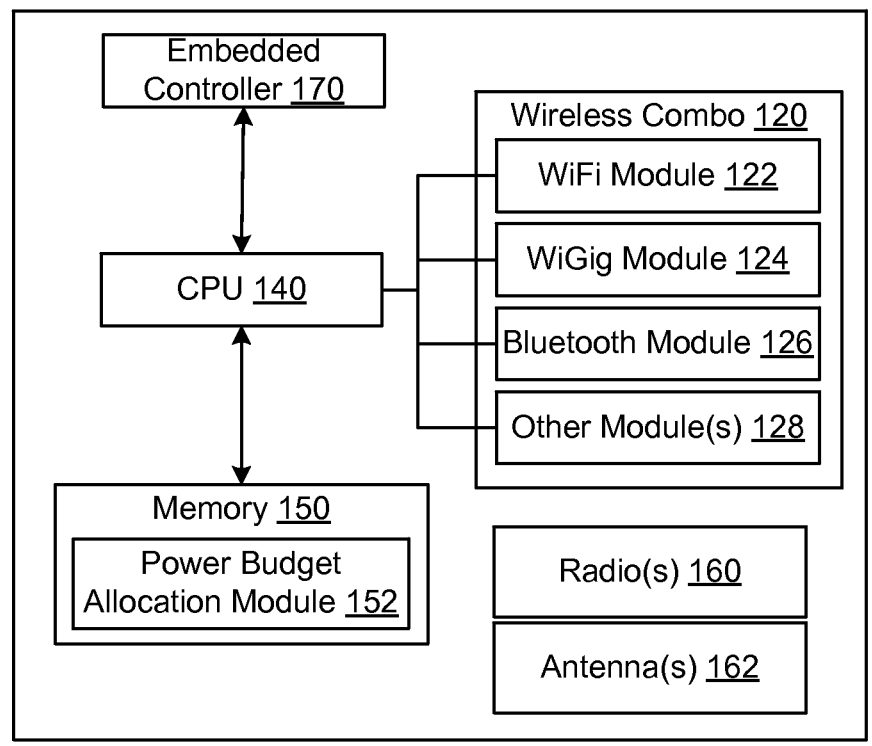
FIG. 1 illustrates a block diagram of an example device configured to dynamically allocate power budgets for operation of wireless modules, according to an embodiment of the disclosure.

FIG. 1 depicts a block diagram 100 of example devices configured to dynamically allocate power budgets for operation of wireless modules, according to an embodiment of the disclosure. One such device may include the user device 110, which may include a wireless unit or combo module 120, a central processing unit (CPU) 140, and a memory 150. The CPU 140 may process information associated with the wireless combo module 120 to determine and reallocate power budgets for operating the wireless unit 120, as will be described in greater detail below.

In some embodiments, the CPU 140 may send all or at least a portion of the information associated with the wireless combo module 120 to an offload processor, such as the embedded controller 170 or another processor separate from the CPU 140, which may perform all or at least a portion of the processes related to dynamically allocating power budgets and configuring the user device 110 to perform according to such power budgets, among other functions. In one configuration, the embedded controller 170 may determine power budget allocations for the wireless modules 122, 124, 126, and 128, and send such information associated with such determinations to the CPU 140, which may use the information to perform the power budget allocations and configurations of the wireless modules 122, 124, 126, and 128. In another configuration, the embedded controller 170 may perform all of such functions independent of the CPU 140.

In yet other embodiments, the user device 140 may send the information associated with the wireless combo module 120 to a remote device (not shown), which may perform all or at least a portion of the processes performed by the CPU 140 or the embedded controller 170. Communication between the user device 110 and such a remote device may occur over one or more networks, which may include a WiFi network, a WiFi Direct network, a wireless local area network (WLAN), or various other wireless or wired networks.

The user device 110 may also include one or more radios 160 and antennas 162 for enabling the wireless modules 122, 124, 126, and 128 to communicate with various other devices over one or more wireless networks. In one configuration, such a radio 160 and an antenna 162 may be located separately from the wireless modules 122, 124, 126, and 128. In other configurations, each of the wireless modules 122, 124, 126, and 128 may include its own one or more radios 160 and antennas 162. According to one example, the WiGig module 124 may include its own radio 160 and antenna 162, while the WiFi module 122 may use a separate, shared radio 160 and antenna 162. Numerous other examples may exist.

The wireless combo module 120 may include various wireless modules, such as a WiFi module 122, a WiGig module 124, a Bluetooth® module 126, and other modules 128 (for example, a Near Field Communication (NFC) module, a Global Navigation Satellite System (GNSS) module, a cellular module, etc.). Each of these modules may include a respective processor, memory, and drivers that may configure the wireless modules to send and/or receive wireless communications according to certain standards, for example, WiFi, WiGig, Bluetooth, etc. In one embodiment, such components may be included on a respective microcontroller or integrated circuit that includes a processor core, a memory, and programmable input/output (I/O) peripherals. As shown in FIG. 1, the modules 122, 124, 126, and 128 may be integrated into a single wireless combo module 120, which may be a wireless local area network (WLAN) combo, in certain embodiments. In this way, a wireless combo module may refer to a grouping or combination of wireless modules.

The user device 110 may also include a memory 150. The memory 150 may include a power budget allocation module 152 for receiving and processing performance information received from the wireless combo module 120 to determine an allocation of power budgets according to the performance of the modules 122, 124, 126, and 128, among other things, as will be described in greater detail below.

The above configuration in FIG. 1 is for purposes of illustration and is not meant to be limiting. Various other configurations may also exist. For example, although only one of each type of device, module, or component is shown, more of each may exist in other configurations.

As used herein, the term "device" may refer to any computing component that includes one or more processors that can be configured to execute computer-readable, computer-implemented, or computer-executable instructions. Example devices may include digital tablets, digital assistants, personal digital assistants, smart phones, personal computers, server farms, Internet appliances, smart cards, wearable devices, application-specific circuits, microcontrollers, minicomputers, transceivers, kiosks, or other processor-based devices. The execution of suitable computer-implemented instructions by one or more processors associated with various devices may form special purpose computers or other particular machines that may implement or facilitate dynamic allocation of power budgets, as described herein.

As described above, the user device 110 may include a radio receiver. A physical layer interface in the radio receiver may include a radio frequency (RF) unit that may be configured to provide for reception of one or more RF signals at one or more frequencies. According to one configuration, the RF unit may include an amplifier, a mixer, a local oscillator, and so forth. The RF unit may be implemented as discrete electronic components, integrated circuits, software-defined radio, or a combination thereof, according to various configurations. The user device 110 may further include a radio transmitter that may send one or more RF signals to one or more access points. In some configurations, the user device 110 may include a radio transceiver that may receive and send RF signals. The transceiver (or the receiver and/or the transmitter) may be coupled to one or more antennas (e.g. antennas 162 associated with the user device 110).

Figure 2:
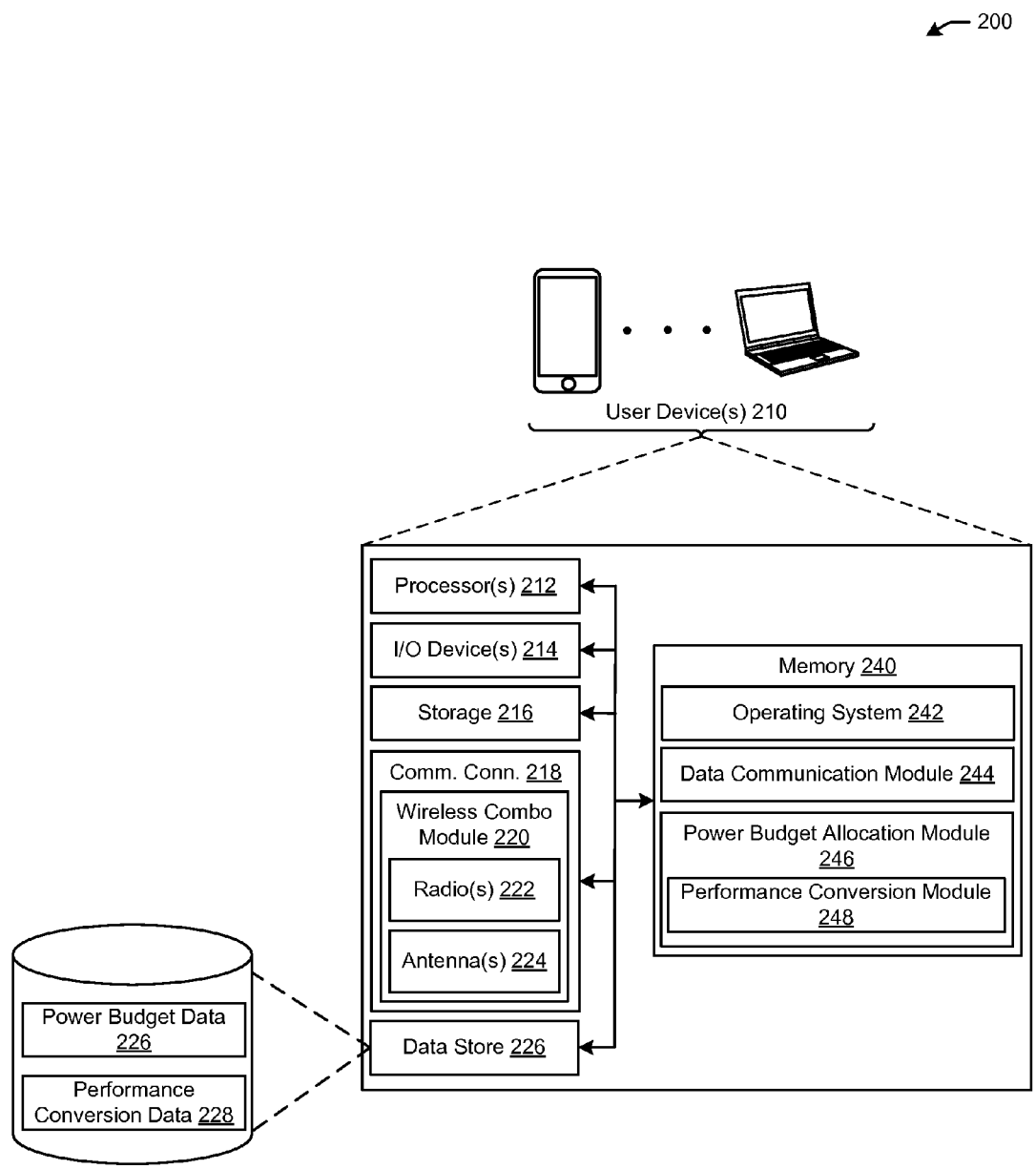
FIG. 2 illustrates an example computing environment for dynamically allocating power budgets for operation of wireless modules, according to an embodiment of the disclosure.

FIG. 2 illustrates an example computing environment 200 for dynamically allocating power budgets for operation of wireless modules, according to an embodiment of the disclosure. The example computing environment 200 may include a user device 210, as well as other devices with which the user device 210 may communicate (not shown). In one embodiment, the user device 210 may embody the user device 110 in FIG. 1.

The user device 210 may include one or more processors configured to communicate with one or more memory devices and various other components or devices. For example, the user device 210 may include one or more processors 212, one or more input/output (I/O) devices 214, storage 216, one or more communication connections 218, and one or more data stores 226. The one or more processors 212 may be implemented as appropriate in hardware, software, firmware, or a combination thereof.

The memory 240 associated with the user device 210 may store program instructions that are loadable and executable on the processor 212, as well as data generated during the execution of these programs. Depending on the configuration and type of user device 210, the memory 240 may be volatile, such as random access memory (RAM), static random access memory (SRAM), dynamic random access memory (DRAM); or non-volatile, such as read-only memory (ROM), Electrically Erasable Programmable Read-Only Memory (EEPROM), flash memory, etc.

The storage 216 associated with the user device 210 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing environment 200.

The memory 240 and the storage 216, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data.

The I/O devices 214 associated with the user device 210 may enable a user to interact with the user device 210. The I/O devices 214 may include, but are not limited to, a keyboard, a mouse, a pen, a voice input device, a touch input device, a gesture detection or capture device, a display, a camera or an imaging device, speakers, and/or a printer.

The one or more communication connections 218 associated with the user device 210 may allow the user device 210 to communicate with other devices over one or more wireless networks (not shown). The communication connections 218 may include, but are not limited to, a wireless combo module 220, such as the wireless combo module 120 in FIG. 1. The wireless combo module 220 may communicate via one or more antennas 224 and one or more radios 222, which may include hardware and software for sending and/or receiving wireless signals over the various types of networks, such as the one or more networks 105 in FIG. 1. In one configuration, the one or more radios 222 and antennas 224 may facilitate communications for each of the wireless modules integrated on the wireless combo module 220 (e.g., the wireless modules 122, 124, 126, and 128 in FIG. 1). In another configuration, each wireless module of the wireless combo module 220 may use a separate one or more radios 222 and antennas 224 for communication.

The data store 226 may store lists, arrays, databases, flat files, etc. In some implementations, the data store 226 may be stored in a memory external to the user device 210 but may be accessible via one or more networks, such as with a cloud storage service. The data store 226 may store information that may facilitate the processes described herein, among other functions associated with the user device 210. In one configuration, the data store 226 may include a database, or other storage mechanism, that may include at least a portion of the information. For example, the data store 226 may include power budget data 226. The power budget data 226 may include a power budget for each component that may consume power in a device (e.g., a WiFi module, a WiGig module, a Bluetooth module, etc.).

In one embodiment, the power budget data 226 may include a unique identification of a component and one or more power values associated with each component. A first power value may be an upper limit for consuming power. A component may be restricted from consuming more than the upper budget, in certain embodiments herein. A second power value may be a lower limit or a minimum requirement for consuming power while a component is in operation. Such a value may restrict the component from underperforming, or consuming too little power to support its operation, which may adversely affect a user's experience. A device in which various components, such as wireless modules, are integrated may also have a power consumption budget. In some embodiments, power consumption budgets may be determined by an Original Equipment Manufacturer (OEM) of the device and/or component.

The data store 226 may also store performance conversion data 228. The performance conversion data 228 may enable conversion of performance information associated with a wireless module to a power budget, which as described above, may include an upper limit and a lower limit for consuming power. For example, a performance state associated with a wireless module may be converted to a power consumption budget, which as described above, may include an upper limit and a lower limit for consuming power. A performance state in which activity of a wireless module is limited may receive a power consumption budget that is lower than that for a performance state in which activity of a wireless module is not limited, as will be described in greater detail below. In one embodiment, OEMs may determine such conversions. Such conversions may be dynamically determined in other embodiments.

As another example, the performance conversion data 228 may enable conversion of a power consumption budget to an actual performance of a wireless module. For example, a transmission rate and/or a delay for sending backoffs to reduce potential packet collisions may be modified to achieve a certain power value, as will be described in greater detail below. Various combinations of such transmissions rates, backoff delays, and corresponding power values may be stored in the data store 226. Such values may also be determined by the OEM, in one embodiment, or may be dynamically determined in other embodiments.

The data store 226 may also include performance level conversion data 230, which may enable systems and methods herein to convert a performance level associated with a wireless module into a power value. In one embodiment, the performance conversion data 228 may include a unique identification of a performance state associated with the performance level and a corresponding power budget, which as described, may include an upper limit and a lower limit for consuming power. Example power states and corresponding budgets will be described in greater detail below.

Turning to the contents in the memory 240, the memory 240 may include, but is not limited to, an operating system (O/S) 242 and various software or program modules, such as the data communication module 244 and the power budget allocation module 246. Each of these modules may be implemented as individual modules that provide specific functionality associated with the processes described herein. Alternatively, one or more of these modules may perform all or at least some of the functionality associated with the other modules.

The data communication module 244 may configure the user device 210 to communicate with various components and devices both internal and external to the user device 210. For example, the data communication module 244 may receive information from wireless modules (e.g., the wireless modules 122, 124, 126, and 128 in FIG. 1). Such information may indicate a performance level associated with the wireless modules, among other things. In one embodiment, the wireless modules may send such information for receipt by the data communication module 244 periodically; according to a schedule or recurring time interval; upon the occurrence of an event, such as a change in the performance state of the wireless module, a change in power consumption, etc.; or according to other time intervals or events.

In some embodiments, the data communication module 244 may query or request performance information from the wireless modules. Such requests may be also performed periodically; according to a schedule or recurring time interval; or upon the occurrence of an event, such as a change in the power consumption of any component in a device in which the wireless modules are stored. For example, a change in power consumption associated with displaying content on a display of the user device 210 may be detected by the data communication module 244, and in response, the data communication module 244 may request information from the wireless modules to, for example, facilitate determining budget allocations across the entire user device 210 or at least a portion of the user device 210 (e.g., the wireless combo module 220). Numerous other examples exist.

The data communication module 244 may also send information to various other devices such as, but not limited to, other user devices 210. The information may be sent according to various data transmission rates and/or transmission techniques, such as those that send backoffs to reduce the potential for packet collisions, etc. Such techniques may modify power consumption (e.g., increase or decrease power consumption) to meet or operate within a particular power budget. For example, a transmission rate may be increased to enable a wireless module to consume more power or decreased to restrict the wireless module so that it consumes less power. As another example, a time interval between which backoffs are sent may be decreased to enable a wireless module to consume more power, or may be increased to reduce the amount of power consumed by the wireless module.

The power budget allocation module 246 may determine a power budget for each wireless module associated with the wireless combo module 220. In one embodiment, such a determination may be based on performance information received for the wireless modules. To determine power budgets, the power budget allocation module 246 may determine an initial power budget for the wireless modules. Such initial power budgets may represent a maximum and minimum power consumption allowed for each wireless module. An OEM of the wireless module may determine such limits, in one example.

The power budget allocation module 246 may also analyze performance information received from a wireless module. Such analysis may include determining a performance state associated with the wireless module. The performance state may be indicated in performance information received from the wireless module, in one embodiment. The performance state may include a category or description of power consumption by the wireless module. Such consumption may be the current power consumption or the potential power consumption, in various embodiments herein. For example, a WiFi module (e.g., the WiFi module 122 in FIG. 1) that is currently connected to a WiFi access point but not yet communicating information associated with a particular service to which the user device 210 has signed onto or requested may indicate that its potential power consumption is unlimited, or more generally, may utilize the maximum allowable power budget for the WiFi module.

As another example, a WiGig module (e.g., the WiGig module 124 in FIG. 1) that is currently connected to a docking system and currently signed onto only a file transfer service 352 offered by the docking system may indicate that its current power consumption is limited, for example, because it is only using a file transfer service instead of all or more of various services offered by the docking system, the utilization of which may increase power consumption. Numerous other examples may exist in other embodiments, some of which are described in greater detail below.

The performance information may also include a unique identification of an access point, a docking system, or other device to which the wireless module is connected; a current load associated with such devices; link quality information associated with a connection between the wireless module and such devices; etc. The performance information received from the wireless module may also include an identification of the service or application onto which the wireless module has signed. Such information may be analyzed by the power budget allocation module 246 to determine an amount by which to adjust a power budget for a wireless module, as will be described in greater detail below. For example, a service that is determined to be relatively processor intensive as compared to other services (as determined by the OEM, service, provider, etc.) may require a relatively higher power budget. Various other services, information, examples, etc., may exist in other embodiments.

The power budget allocation module 246 may include various modules that may facilitate allocation of power budgets to wireless modules. One such module may include the performance conversion module 248, which may determine a power budget based on a performance state associated with a wireless module, in one embodiment. For example, the performance conversion module 248 may access the data store 226 to identify a power budget, including an upper limit and a lower limit, associated with a performance state of the wireless module. Such information may be identified by cross-referencing or looking up the performance state in the data store 226, in one embodiment. As described above, each performance state may include a power budget and data transmission parameters for achieving the power budget, among other information. As other examples, the type of service and link quality information may also be identified in the data store 226 to obtain a power budget based on the performance associated with the wireless module. Each of these parameters, as well as other parameters, may be used alone, or in combination with one another, to determine a power budget for a wireless module.

The power budget allocation module 246 may adjust the power budget for each wireless module according to the above determined power budgets, in one embodiment. For example, a power budget may be reduced for a first wireless module that has a limited performance state and increased for a second wireless module that has an unlimited performance state. Adjustment of power budgets may include modifying the transmission rate of data (e.g., data associated with a service) and/or the number and rate of backoffs that are sent from a respective user device 210, in certain embodiments herein. For example, a delay or time interval between which backoffs are sent may be increased to reduce power consumption by a wireless module. Conversely, the delay or time interval may be decreased to increase power consumption by the wireless module, and as a consequence, may reduce the need to retransmit data packets because sending more backoffs may reduce the potential for data packets to collide with another data packet or find interference. Similarly, relatively low transmission speeds for transmitting data packets may require less power consumption, and therefore, may operate according to relatively lower power budgets. The converse may also exist such that relatively high transmission speeds for transmitting data packets may operate according to relatively higher power budgets. Various other techniques may be used to enable a wireless module to operate according to a certain power budget or within a certain power budget range, in other embodiments.

As described above, the data store 226 (or other storage mechanism) may include values for transmission rates and/or backoff delays associated with each possible power budget. In one embodiment, the performance conversion module 248 may convert a performance state to a power budget, and then convert the power budget to transmission parameters, such as the transmission rates and/or backoff delays, that may be used to implement the power budget adjustments. The power budget allocation module 246 may perform such adjustments, in one embodiment. Examples of the adjustments will be described in greater detail below.

In some embodiments, the power budget allocation module 246 may implement one or more algorithms to determine a power budget based on performance information. Such algorithms may include determining the power budget based on historical activity associated with a service, a software application, an access point, a docking system, or others services or devices accessed by the user device 210. For example, if a wireless module has a historical power consumption (e.g., based on transmission rate and/or backoff delay times) that is different from a current power budget determined by an OEM, then the historical power budget may be used, in some examples.

In determining power budgets, the power budget allocation module 246 may also verify that the power budget for each wireless combo in combination does not exceed the total power budget for the wireless combo module 220.

The above configuration in FIG. 2 is for purposes of illustration and is not meant to be limiting. For example, various other modules, algorithms, functions, etc., may exist in other embodiments. Further, all or at least a portion of the functions performed by the processor 212 may be performed by another processor (e.g., a processor associated with the embedded controller 170 in FIG. 1) and/or a remote device in communication with the user device 210 over one or more networks, in various embodiments herein.

Figure 3:
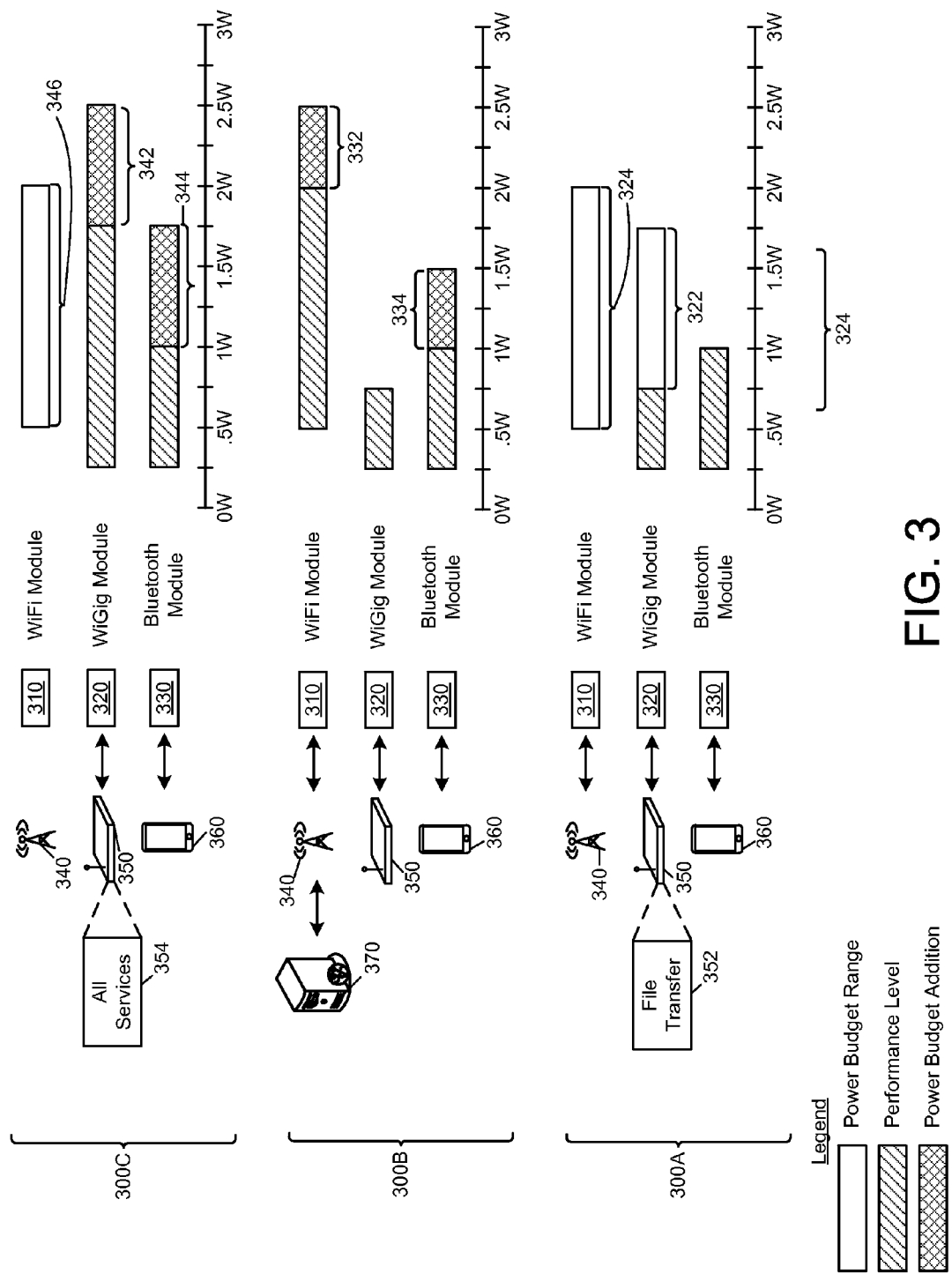
FIG. 3 illustrates example power budget allocations based on various performance information associated with wireless modules, according to an embodiment of the disclosure.

FIG. 3 depicts example power budget allocations 300a-c based on various performance information associated with wireless modules, according to an embodiment of the disclosure. Such wireless modules may include a WiFi module 310, a WiGig module 320, and a Bluetooth module 330. In one embodiment, such modules may be integrated onto a wireless combo module, such as the wireless combo module 120 in FIG. 1. Each of the wireless modules 310, 320, and 330 may communicate with various devices, such as a wireless access point 340, a docking system 350, and various other devices 360. As used herein, a docking system may enable devices to access one or more peripherals connected to the docking system via a wired or wireless network. In this way, the docking system may enable devices to access various services associated with the docking system.

As shown in example 300a, each of the wireless modules 310, 320, and 330 may have a power budget. As described, the power budget may include an upper limit and a lower limit beyond both of which power consumption may be restricted.

In this way, the power budget may be referred to as a power budget range, as indicated in the legend of FIG. 3. For example, the WiFi module 310 may have a range of 0.5 watt to 2.0 watts; the WiGig module 320 may have a range of 0.25 watt to 1.75 watts; and the Bluetooth module 330 may have a range of 0.25 watt to 1.0 watt. A wireless combo module that includes each of the wireless modules 310, 320, and 330 may have a total power budget of 4.75 watts (e.g., obtained by summing the upper limits 2.0 watts, 1.75 watts, and 1.0 watts), in one embodiment.

An arrow between the wireless modules 310, 320, 330 and the devices 340, 350, 360 may indicate a respective connection between the wireless modules and such devices. For example, the WiFi module 310 may be connected to the access point 340; the WiGig module 320 may be connected to the docking system 350; and the Bluetooth module 330 may be connected to the user device 360, in the example 300a. In one embodiment, a performance state may be determined based on a performance level associated with the wireless modules 310, 320, and 330. The performance level may provide an indication of whether the wireless modules 310, 320, and 330 are connected to a network or another device, whether the wireless modules are signed onto a service or application, an activity level associated with the service or application, and/or various other information.

For example, a performance state for the WiFi module 310 may indicate that it is connected to the access point 340 but not yet signed onto a service, as shown in example 300a. In this instance, the WiFi module 310 may have a power budget upper limit of 2 watts, which may be the total budget allocated to the WiFi module 310 when the other wireless modules 320 and 330 are in operation, in an example embodiment. In this way, the WiFi module 310 may utilize its entire power budget to support the WiFi module's 310 access to any number or type of services. Such a performance state may be identified for the other wireless modules, such as the wireless modules 320 and 330, in other examples.

As another example, a performance state may be determined for the WiGig module 320 when it is connected to the docking system 350 to utilize only an electronic mail service, or more generally, to utilize a system for a limited purpose, as shown in example 300a. Such a performance state may be referred to herein as "limited," or similar, and may describe connections in which a wireless module may utilize only a portion of available services or functions, a relatively low CPU intensive service, or generally instances in which limitations or restrictions are imposed on the utilization of a system, service, function, etc. In such instances, the WiGig module 320 may have a limited power budget (e.g., upper limit) of 0.75 watt, which may represent a portion of the total allocated budget of 1.75 watts when the other wireless modules 310 and 330 are in operation, in an example embodiment. The performance state of "limited" may be associated with the other wireless modules, in other examples.

As another example, a performance state for the Bluetooth module 330 may indicate that it is communicating with another device 360, as shown in example 300a, in unrestricted fashion. In such instances, the Bluetooth module 330 may have a power budget of 1.0 watt, as an example. Such a performance state may also be associated with the other wireless modules, in other examples. For example, a WiGig module 320 that has access to all services 354 provided by the docking system 350 may have access to an entire power budget of 1.5 watts allocated for the WiGig module 320 in example 300a. Numerous other examples may exist.

As yet another example, a performance state of "idle," or similar, may be associated with wireless modules 310, 320, or 330 that are not yet connected to a network, in one embodiment. For example, a WiFi module 310 that is not connected to an access point 340, a WiGig module 320 that is not within range of the docking system 350 for docking, and a Bluetooth module 330 that is not currently exchanging information via Bluetooth may each be considered examples of idle performance states, in certain embodiments herein. Various other performance states may exist in other examples. Each of the performance states may be associated with its own power budget, as described above.

Each of the wireless modules 310, 320, and 330 may send information associated with its performance, such as the performance state, connectivity, performance level, link quality, quality of service, etc., to the user device in which the wireless modules 310, 320, and 330 are integrated (e.g., the user device 210 in FIG. 2).

As described, a wireless combo module (e.g., the wireless combo module 120 in FIG. 1) with which each of the wireless modules 310, 320, and 330 may be associated may have a total power budget that is shared among each of the wireless modules 310, 320, and 330. Each wireless module 310, 320, and 330 may also have its own individual allocated power budget that, in total, may be the same as, or approximately the same as, the total power budget for the wireless combo module, in one embodiment. In other embodiments, the total of the individual power budgets for the wireless modules 310, 320, and 330 (as well as other wireless modules) may be a value that is less than the total power budget for the wireless combo module due to the skin temperature of the user device in which the wireless combo module is embedded and various other factors that may reduce available power consumption of the user device. According to these embodiments, the total power budgets of the wireless modules 310, 320, and 330 may by the same, or approximately the same, as the total power budget of the wireless module less the reduced budget amount due to the skin temperature and/or other factors.

In the manner described above, the shared power budget may be allocated in optimized fashion such that at least a portion of the power budgets associated with wireless modules 310, 320, or 330 that are not using all of their allocated power budgets may be reallocated to other wireless modules 310, 320, or 330, which may thereafter benefit from increased power consumption. In this way, a power budget for any one of the wireless modules 310, 320, or 330 may be increased to a certain amount (e.g., an amount greater than the individual power budget) when the other modules are idle or not in use, for example.

As an example, the WiGig module 320 in example 300a may be using only a portion of its individual allocated power budget by virtue of being in a limited performance state, as described above and illustrated by the diagonal lines in the WiGig module 320 performance budget range bar. The portion 322 may represent an amount of power budget that is unutilized by the WiGig module 320. In the present example, such a portion is 1.0 watt (e.g., 1.75 watts–0.75 watts). Such a portion of 1.0 watt may be reallocated for utilization by the WiFi module 310 and/or the Bluetooth module 330, depending on the performance state of such modules and other factors, as described in the examples below.

Various techniques may be used to reallocate unutilized power budget across one or more wireless modules. For example, unutilized power budget may be allocated evenly across the remaining wireless modules. In the present example of allocating the 1.0 watt of power budget unutilized by the WiGig module 320, the 1.0 watt may be shared evenly across the WiFi module 310 and the Bluetooth module 330 such that each of these modules receives an additional 0.5 watt of power budget. Such an additional power budget allocation is shown in the example 300b as portion 332 for the WiFi module 310 and portion 334 for the Bluetooth module 330.

The unutilized portion 332 in the example 300a may no longer be associated with the WiGig module 320 in the example 300b since the portion 332 has been reallocated as shown. The total power budget of 4.75 watts remains intact, while the power budgets have been reallocated such that the WiFi module 310 has a new power budget of 2.5 watts; the WiGig module 320 has a new power budget of 0.75 watt; and the Bluetooth module 330 has a new power budget of 1.5 watts, as shown. The Bluetooth module 330, after the addition of the new power budget, may be able to consume power up to 1.5 watts, as shown by the diagonal lines and may include the crosshatches for the portion 334. The WiFi module 310, which may be communicating with a server 370 (as indicated by the arrows connecting the components to the access point 340), may utilize its new power budget, as illustrated by the diagonal lines and may include the crosshatches for the portion 332.

In other examples, unutilized power budget may be allocated among wireless modules according to any number of rules or criteria. Such rules or criteria may indicate one or more preferences for allocating unutilized power budget among wireless modules. For example, a percentage of unutilized power budget may be indicated for each wireless module, a rank order list in which the wireless modules may receive the allocation, and various other information. According to the present example, a rule may specify that 75% of the 1.0 watt of unutilized power budget associated with the WiGig module 320 may be allocated to the WiFi module 310 and 25% may be allocated to the Bluetooth module 330. Various other percentages and allocation techniques may be used in other examples.

In some embodiments, budget reallocations may also be verified against a power consumption rating or other indicator to ensure that power consumption by a wireless module does not exceed a design limit or other requirement. For example, if the WiGig module 320 has a design limit of 2.25 watts, then a smaller portion of the unutilized 1.0 watt in the example 300a may be allocated to the WiFi module 310 (that is, only 0.25 watt may be allocated in the present example instead of 0.5 watt to remain at or below the design limit of 2.25 watts). In such an instance, the remaining 0.75 watt of unutilized power budget of the WiGig module 320 may be allocated to the Bluetooth module 330, thereby increasing the power budget upper limit to 1.75 watts (assuming such a value does not exceed the design rating or other limitation for the Bluetooth module 330, in the present example).

In other embodiments, the power budget for any wireless module may be increased to the total power budget for the wireless combo module on which the wireless module is integrated, as mentioned above. Any number of techniques may be used to allocate power budgets among wireless modules, in other embodiments.

The example 300c illustrates a further change in performance state and subsequent reallocations based on the change. According to this example, the WiFi module 310 may disconnect from the access point 340 (as indicated by no arrow being between such components). By virtue of such disconnection, an unutilized power budget associated with the WiFi module 210 of 2.0 watts (e.g., as determined by summing the original portion 324 of 1.5 watts in example 300a and the additional 0.5 watt indicated by the portion 332 in example 300b) may be reallocated among the WiGig module 320, which is no longer in a limited performance state by virtue of its utilization of all services 354 provided by the docking system 350, and among the Bluetooth module 330, which may continue to communicate with the device 360 as shown.

In one embodiment, the 1.0 watt received from the WiGig module 320 in example 300b, where the WiGig module 320 was operating in a limited state, may be returned to the WiGig module 320 (e.g., 0.5 watt from the WiFi module 310 plus 0.5 watt from the Bluetooth module 330). The remaining 1.5 watts associated with the WiFi module 310, as indicated by the portion 346, may be allocated evenly among the WiGig module 320 and the Bluetooth module 330 since the WiFi module 310 may no longer require such power budget because it may no longer be connected to the access point 340, in one embodiment. According to this embodiment, the WiGig module 320 may receive a power budget addition of 0.75 watt (e.g., 1.5 watts/2), as illustrated by the portion 342, and the Bluetooth module 330 may receive a power budget addition of 0.75 watt, as illustrated by the portion 344. The WiFi module 310 may have remaining only its lower limit for power consumption, as shown. The 2.5 watts may also be reallocated according to one or more other techniques, such as those described above.

After the WiFi module 310 reestablishes a connection with the access point 340, or another device, the power budget for the WiFi module 310 may be increased, or otherwise readjusted, based on the performance state associated with the WiFi module 310. In this way, any of the wireless modules 310, 320, or 330 may have their power budgets increased or decreased in sharing manner to optimize performance of the wireless modules, in certain embodiments herein.

In certain embodiments herein, data transmission associated with each of the wireless modules 310, 320, and 330 may be modified to meet a certain power budget value. For example, a transmission speed and/or time interval at which backoffs are sent to other devices with which the wireless modules 310, 320, and 330 may communicate may be modified to obtain a certain power value. An example of such modifications may be illustrated by following performance state changes for the WiGig module 320 from example 300a through example 300c. In the example 300a, the WiGig module 320 may send a backoff every 2 milliseconds (ms) to obtain a power budget upper limit of 0.75 watt. The WiGig module 320 may also not send a backoff less frequently than every 4 ms to ensure that at least the power budget lower limit of 0.25 watt is maintained, in one example. The same time interval for sending backoffs may be maintained in the example 300b, since the power budget has not changed for the WiGig module 320. In the example 300c, backoffs may be sent more frequently (e.g., one every 1.0 ms) to utilize the increased power budget upper limit of 2.5 watts. In this way, the frequency at which a backoff is sent may be increased or decreased to utilize more or less, respectively, of a power budget allocated to a wireless module 310, 320, or 330.

Similar to the frequency of sending backoffs, the transmission speed at which data packets are sent from the wireless modules 310, 320, and 330 may also be modified to reach a certain power value or power budget range. Various other performance metrics may also, or as an alternative, be modified, alone or in conjunction with one or more other performance metrics, to reach a certain power value or power budget range in various embodiments herein.

The above examples in FIG. 3 are for purposes of illustration and are not meant to be limiting. Numerous other values may exist in other examples. For example, the power budget values, backoff delay values, types of wireless modules, types of devices in communication with the wireless modules, etc., may vary in other embodiments. Although only a WiFi module, a WiGig module, and a Bluetooth module are used in the above examples, a different number and type of these modules may exist in other examples. Also, the values in the above examples may be approximate values and not meant to be exact values in every instance. Further, performance states may have various other identifications or descriptions, and fewer or more performance states may exist in other examples.

Figure 4:
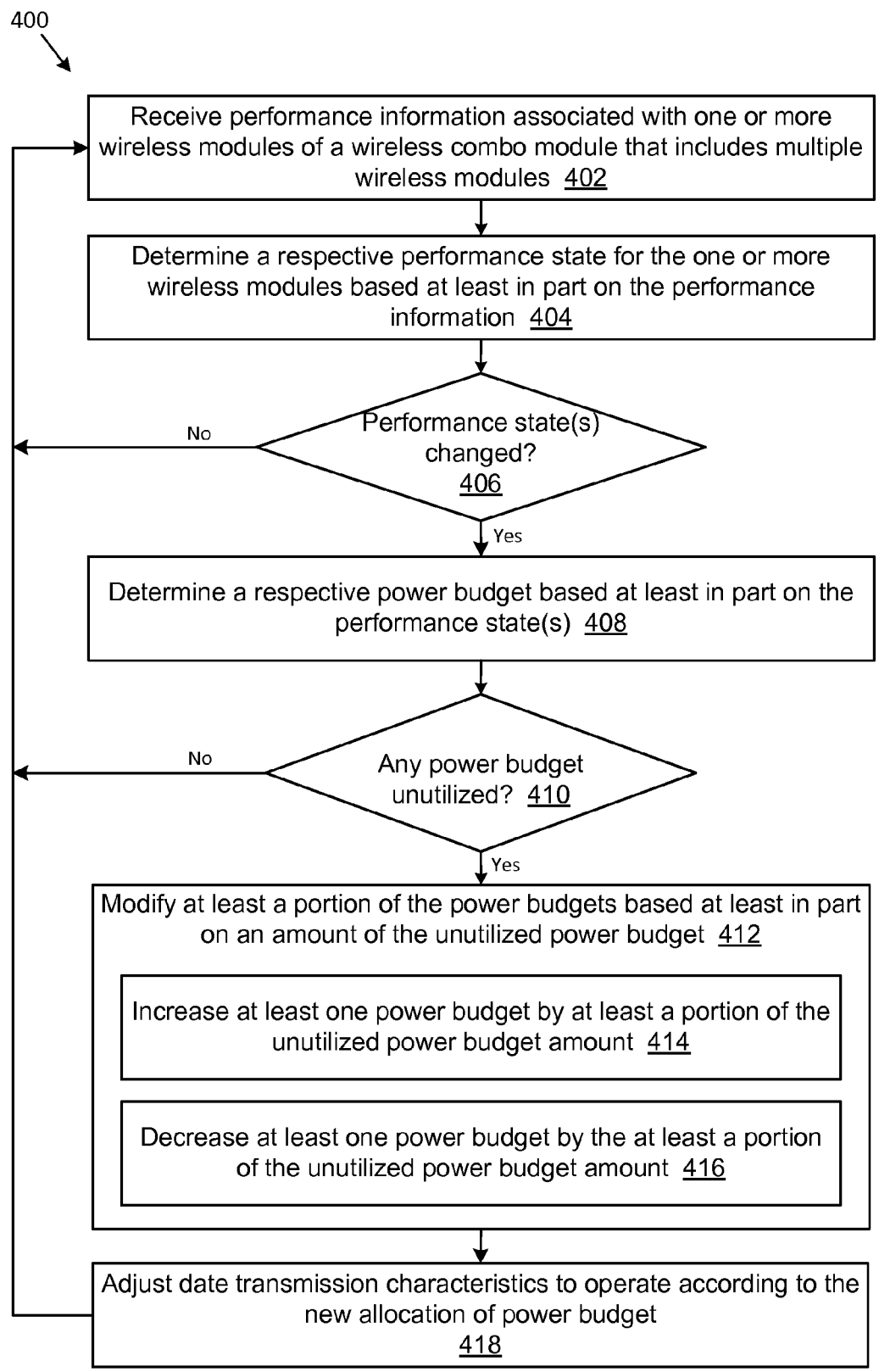
FIG. 4 illustrates a flow diagram of an example process for dynamically allocating power budgets for operation of wireless modules, according to an embodiment of the disclosure.

FIG. 4 depicts a flow diagram of an example process 400 for dynamically allocating power budgets for operation of wireless modules, according to an embodiment of the disclosure. In one embodiment, the example process may be implemented by the user device 210 in FIG. 2. The example process 400 may begin at block 402, where performance information associated with one or more wireless modules of a wireless combo module that includes multiple wireless modules (e.g., the wireless modules 122, 124, 126, and 128 of the wireless combo module 120 in FIG. 1) may be received (e.g., by the data communication module 244). The performance information may include a performance state associated with the wireless module, a unique identification of a device to which the wireless module is connected, a current load associated with such a device, link quality information associated with a connection between the wireless module and such a device, quality of service information, a level of interference, etc.

A performance state associated with the one or more wireless modules may be determined based at least in part on the performance information (e.g., by the performance conversion module 248 in FIG. 2) at block 404. Such a determination may include identifying the performance state in the performance information received at block 402, in one embodiment. In another embodiment, the determination may be based at least in part on the performance metrics indicated in the performance information described above. For example, a performance state of "limited" as described above, may be associated with connections that have a poor link quality or a high level of interference. Numerous other examples may exist.

At block 406, a determination may be made as to whether a performance state associated with any of the one or more wireless modules has changed. If a performance state has not changed, then processing may return to block 402, where performance information for one or more wireless modules may be received. If a performance state for any of the one or more wireless modules has changed, then a power budget for the multiple wireless modules of the wireless combo module may be determined based at least in part on the respective performance states, at block 408. In one embodiment, the determination may include identifying a power budget that corresponds to the determined performance state. A respective power budget may be stored in association with each performance state associated with a wireless module, in certain embodiments herein.

At block 410, a determination may be made as to whether additional power budget has become available for allocation among the wireless modules, such as an amount of power budget that is not being utilized by a wireless module. Additional power budget may become available if, for example, a wireless module is operating in a more limited state or does not require as much power consumption for operation. Such a determination may be made based on a comparison between a previous performance state and a current performance state, in one embodiment. If unutilized power budget is not available, then processing may return to block 402. If unutilized power budget is available, then processing may continue to block 412.

At block 412, a current power budget associated with the one or more wireless modules may be modified based at least in part on the amount of unutilized power budget. For example, a WiFi module that previously had a power budget upper limit of 2.0 watts may receive an additional 0.5 watt that is no longer required by a WiGig module, which may be operating in a more limited mode than previously. The power budget for a Bluetooth module, or other module, may also be accessed to determine whether at least a portion of the newly available power budget may be allocated to these modules, and if so, may also be adjusted.

Such adjustment of power budgets may include increasing at least one power budget by at least a portion of the unutilized power budget amount at block 414. At least one power budget may also be decreased by the at least a portion of the unutilized power budget amount at block 416. In this way, a power budget associated with a wireless combo module may be shared among its wireless combo modules by reallocating the individual power budgets of the wireless modules according to the power consumption needs of the wireless modules.

One or more data transmission characteristics (e.g., the transmission speed, time delay for sending backoffs, etc.) may be adjusted to meet the power budget allocation for the wireless modules at block 418. Processing may thereafter return to block 402, in one embodiment.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

In an example embodiment, there is disclosed a method. The method may include receiving, by at least one processor, performance information associated with at least one wireless module of a wireless combo module. The performance information may indicate a performance state associated with the at least one wireless module. The performance information may also include an identification of at least one of a service or a device to which the at least one wireless module is connected. In one embodiment, the at least one wireless module may include a WiFi module, a WiGig module, and at least one of a Bluetooth module, a Near Field Communication (NFC) module, a Global Navigation Satellite System (GNSS) module, or a cellular module.

The method may also include determining, by the at least one processor, an unutilized amount of a first power budget associated with the at least one wireless module. The determination may be based at least in part on the performance information. The method may further include modifying, by the at least one processor, the first power budget and a second power budget associated with a second wireless module of the wireless combo module. Such modification may include decreasing the first power budget by the unutilized amount, and increasing the second power budget by at least a portion of the unutilized amount.

In one embodiment, the at least a portion of the unutilized amount may include a first portion. The method may further include increasing, by the user device, a third power budget by a second portion of the unutilized amount. The third power budget may be associated with a third wireless module of the wireless combo module.

The method may also include selecting, by the user device, a backoff time interval based at least in part on the first power budget, and sending, by the user device, a backoff according to the backoff time interval so that the at least one wireless module consumes an amount of power approximately equal to the first power budget, in one embodiment. Approximately equal may mean that a certain tolerance within the exact power budget value (e.g., the upper limit of the power budget) is acceptable. Such a tolerance may include +/−0.05%, 0.5 percent, 1.0%, 10%, or any other percentages. Such percentages may be predetermined in one embodiment.

In one embodiment, the performance information may include first performance information. According to this embodiment, the method may further include receiving, by the user device, second performance information associated with the at least one wireless module, and modifying, by the user device, the backoff time interval so that the at least one wireless module consumes an amount of power associated with the second performance information.

The method may also include selecting, by the user device, a transmission rate for transmitting one or more data packets. The selection may be based at least in part on the first power budget. The method may further include sending, by the user device, the one or more data packets according to the transmission rate so that the at least one wireless module consumes an amount of power approximately equal to the first power budget. Approximately equal may mean that a certain tolerance within the exact power budget value (e.g., the upper limit of the power budget) is acceptable. Such a tolerance may include +/−0.05%, 0.5 percent, 1.0%, 10%, or any other percentages. Such percentages may be predetermined in one embodiment.

In one embodiment, the performance information may include first performance information. According to this embodiment, the method may further include receiving, by the user device, second performance information associated with the at least one wireless module, and modifying, by the user device, the transmission rate so that the at least one wireless module consumes an amount power associated with the second performance information.

In another example embodiment, there is disclosed a system. The system may include one or more radios, one or more antennas, at least one memory that stores computer-executable instructions, and at least one processor configured to access the at least one memory. The at least one processor may be configured to execute the computer-executable instructions to perform various functions. For example, the at least one processor may be configured to receive performance information associated with at least one wireless module of a wireless combo module. The performance information may indicate a performance state associated with the at least one wireless module. The performance information may also include an identification of at least one of a service or a device to which the at least one wireless module is connected. In one embodiment, the at least one wireless module may include a WiFi module, a WiGig module, and at least one of a Bluetooth module, a Near Field Communication (NFC) module, a Global Navigation Satellite System (GNSS) module, or a cellular module.

The at least one processor may also be configured to determine an unutilized amount of a first power budget associated with the at least one wireless module. The determination may be based at least in part on the performance information. The at least one processor may also be configured to modify the first power budget and a second power budget associated with a second wireless module of the wireless combo module. Such modification may include decreasing the first power budget by the unutilized amount, and increasing the second power budget by at least a portion of the unutilized amount.

In one embodiment, the at least a portion of the unutilized amount may include a first portion. The at least one processor may also be configured to increase a third power budget by a second portion of the unutilized amount. The third power budget may be associated with a third wireless module of the wireless combo module.

The at least one processor may also be configured to select a backoff time interval based at least in part on the first power budget, and sending, by the user device, a backoff according to the backoff time interval so that the at least one wireless module consumes an amount of power approximately equal to the first power budget. Approximately equal may mean that a certain tolerance within the exact power budget value (e.g., the upper limit of the power budget) is acceptable. Such a tolerance may include +/−0.05%, 0.5 percent, 1.0%, 10%, or any other percentages. Such percentages may be predetermined in one embodiment.

In one embodiment, the performance information includes first performance information. According to this embodiment, the at least one processor may also be configured to receive second performance information associated with the at least one wireless module, and modifying, by the user device, the backoff time interval so that the at least one wireless module consumes an amount of power associated with the second performance information.

The at least one processor may also be configured to select a transmission rate for transmitting one or more data packets. The selection may be based at least in part on the first power budget. The at least one processor may also be configured to send the one or more data packets according to the transmission rate so that the at least one wireless module consumes an amount of power approximately equal to the first power budget. Approximately equal may mean that a certain tolerance within the exact power budget value (e.g., the upper limit of the power budget) is acceptable. Such a tolerance may include +/−0.05%, 0.5 percent, 1.0%, 10%, or any other percentages. Such percentages may be predetermined in one embodiment.

In one embodiment, the performance information may include first performance information. According to this embodiment, the at least one processor may also be configured to receive second performance information associated with the at least one wireless module, and modify the transmission rate so that the at least one wireless module consumes an amount power associated with the second performance information.

In another example embodiment, there are disclosed one or more computer-readable media storing computer-executable instructions that, when executed by at least one processor, configure the at least one processor to perform various operations. The operations may include receiving performance information associated with at least one wireless module of a wireless combo module. The performance information may indicate a performance state associated with the at least one wireless module. The performance information may also include an identification of at least one of a service or a device to which the at least one wireless module is connected. In one embodiment, the at least one wireless module may include a WiFi module, a WiGig module, and at least one of a Bluetooth module, a Near Field Communication (NFC) module, a Global Navigation Satellite System (GNSS) module, or a cellular module.

The operations may also include determining an unutilized amount of a first power budget associated with the at least one wireless module. The determination may be based at least in part on the performance information. The operations may further include modifying the first power budget and a second power budget associated with a second wireless module of the wireless combo module. Such modification may include decreasing the first power budget by the unutilized amount, and increasing the second power budget by at least a portion of the unutilized amount.

In one embodiment, the at least a portion of the unutilized amount may include a first portion. The operations may further include increasing a third power budget by a second portion of the unutilized amount. The third power budget may be associated with a third wireless module of the wireless combo module.

The operations may also include selecting a backoff time interval based at least in part on the first power budget, and sending a backoff according to the backoff time interval so that the at least one wireless module consumes an amount of power approximately equal to the first power budget. Approximately equal may mean that a certain tolerance within the exact power budget value (e.g., the upper limit of the power budget) is acceptable. Such a tolerance may include +/−0.05%, 0.5 percent, 1.0%, 10%, or any other percentages. Such percentages may be predetermined in one embodiment.

In one embodiment, the performance information may include first performance information. According to this embodiment, the operations may further include receiving second performance information associated with the at least one wireless module, and modifying the backoff time interval so that the at least one wireless module consumes an amount of power associated with the second performance information.

The operations may also include selecting a transmission rate for transmitting one or more data packets. The selection may be based at least in part on the first power budget. The method may further include sending the one or more data packets according to the transmission rate so that the at least one wireless module consumes an amount of power approximately equal to the first power budget. Approximately equal may mean that a certain tolerance within the exact power budget value (e.g., the upper limit of the power budget) is acceptable. Such a tolerance may include +/−0.05%, 0.5 percent, 1.0%, 10%, or any other percentages. Such percentages may be predetermined in one embodiment.

In one embodiment, the performance information may include first performance information. According to this embodiment, the operations may further include receiving second performance information associated with the at least one wireless module, and modifying the transmission rate so that the at least one wireless module consumes an amount power associated with the second performance information.

In another example embodiment, there is disclosed an apparatus. The apparatus may include means for receiving performance information associated with at least one wireless module of a wireless combo module. The performance information may indicate a performance state associated with the at least one wireless module. The performance information may also include an identification of at least one of a service or a device to which the at least one wireless module is connected. In one embodiment, the at least one wireless module may include a WiFi module, a WiGig module, and at least one of a Bluetooth module, a Near Field Communication (NFC) module, a Global Navigation Satellite System (GNSS) module, or a cellular module.

The apparatus may also include means for determining an unutilized amount of a first power budget associated with the at least one wireless module. The determination may be based at least in part on the performance information. The apparatus may further include means for modifying the first power budget and a second power budget associated with a second wireless module of the wireless combo module. Such modification may include means for decreasing the first power budget by the unutilized amount, and means for increasing the second power budget by at least a portion of the unutilized amount.

In one embodiment, the at least a portion of the unutilized amount may include a first portion. The apparatus may further include means for increasing a third power budget by a second portion of the unutilized amount. The third power budget may be associated with a third wireless module of the wireless combo module.

The apparatus may also include means for selecting a backoff time interval based at least in part on the first power budget, and means for sending a backoff according to the backoff time interval so that the at least one wireless module consumes an amount of power approximately equal to the first power budget. Approximately equal may mean that a certain tolerance within the exact power budget value (e.g., the upper limit of the power budget) is acceptable. Such a tolerance may include +/−0.05%, 0.5 percent, 1.0%, 10%, or any other percentages. Such percentages may be predetermined in one embodiment.

In one embodiment, the performance information may include first performance information. According to this embodiment, the apparatus may further include means for receiving second performance information associated with the at least one wireless module, and means for modifying the backoff time interval so that the at least one wireless module consumes an amount of power associated with the second performance information.

The apparatus may also include means for selecting a transmission rate for transmitting one or more data packets. The selection may be based at least in part on the first power budget. The apparatus may further include sending the one or more data packets according to the transmission rate so that the at least one wireless module consumes an amount of power approximately equal to the first power budget. Approximately equal may mean that a certain tolerance within the exact power budget value (e.g., the upper limit of the power budget) is acceptable. Such a tolerance may include +/−0.05%, 0.5 percent, 1.0%, 10%, or any other percentages. Such percentages may be predetermined in one embodiment.

In one embodiment, the performance information may include first performance information. According to this embodiment, the apparatus may further include means for receiving second performance information associated with the at least one wireless module, and means for modifying the transmission rate so that the at least one wireless module consumes an amount power associated with the second performance information.

What is claimed is:

1. A method comprising:
   receiving, by at least one processor, performance information associated with at least one wireless module of a wireless combo module;
   determining, by the at least one processor, an unutilized amount of a first power budget associated with the at least one wireless module, the determination based at least in part on the performance information;
   modifying, by the at least one processor, the first power budget and a second power budget associated with a second wireless module of the wireless combo module, wherein the modification comprises: (i) decreasing the first power budget by the unutilized amount and (ii) increasing the second power budget by at least a portion of the unutilized amount;
   selecting, by the at least one processor, a backoff time interval based at least in part on the first power budget; and
   sending, by the at least one processor, a backoff according to the backoff time interval so that the at least one wireless module consumes an amount of power approximately equal to the first power budget.

2. The method of claim 1, wherein the at least a portion of the unutilized amount comprises a first portion, and wherein the method further comprises:
   increasing, by the processor, a third power budget by a second portion of the unutilized amount, the third power budget associated with a third wireless module of the wireless combo module.

3. The method of claim 1, wherein the performance information indicates a performance state associated with the at least one wireless module.

4. The method of claim 1, wherein the performance information comprises an identification of at least one of a service or a device to which the at least one wireless module is connected.

5. The method of claim 1, wherein the performance information comprises first performance information, the method further comprising:
   receiving, by the processor, second performance information associated with the at least one wireless module; and
   modifying, by the processor, the backoff time interval so that the at least one wireless module consumes an amount of power associated with the second performance information.

6. The method of claim 1, further comprising:
   selecting, by the processor, a transmission rate for transmitting one or more data packets, the selection based at least in part on the first power budget; and
   sending, by the processor, the one or more data packets according to the transmission rate so that the at least one wireless module consumes an amount of power approximately equal to the first power budget.

7. The method of claim 6, wherein the performance information comprises first performance information, the method further comprising:
   receiving, by the processor, second performance information associated with the at least one wireless module; and
   modifying, by the processor, the transmission rate so that the at least one wireless module consumes an amount of power associated with the second performance information.

8. The method of claim 1, wherein the at least one wireless module comprises a WiFi module, a WiGig module, and at least one of a Bluetooth module, a Near Field Communication (NFC) module, a Global Navigation Satellite System (GNSS) module, or a cellular module.

9. A system comprising:
   one or more radios;
   one or more antennas;
   at least one memory that stores computer-executable instructions; and
   at least one processor configured to access the at least one memory, wherein the at least one processor is configured to execute the computer-executable instructions to:

receive performance information associated with at least one wireless module of a wireless combo module;

determine an unutilized amount of a first power budget associated with the at least one wireless module, the determination based at least in part on the performance information;

modify the first power budget and a second power budget associated with a second wireless module of the wireless combo module, wherein the modification comprises: (i) decreasing the first power budget by the unutilized amount and (ii) increasing the second power budget by at least a portion of the unutilized amount select a backoff time interval based at least in part on the first power budget; and send a backoff according to the backoff time interval so that the at least one wireless module consumes an amount of power approximately equal to the first power budget.

10. The system of claim 9, wherein the at least a portion of the unutilized amount comprises a first portion, and wherein the at least one processor is further configured to:

increase a third power budget a second portion of the unutilized amount, the third power budget associated with a third wireless module of the wireless combo module.

11. The system of claim 9, wherein the performance information indicates a performance state associated with the at least one wireless module.

12. The system of claim 9, wherein the performance information comprises an identification of at least one of a service or a device to which the at least one wireless module is connected.

13. The system of claim 9, wherein the performance information comprises first performance information, and wherein the at least one processor is further configured to:

receive second performance information associated with the at least one wireless module; and modify the backoff time interval so that the at least one wireless module consumes an amount of power associated with the second performance information.

14. The system of claim 9, the at least one processor further configured to:

select a transmission rate for transmitting one or more data packets, the selection based at least in part on the first power budget; and send the one or more data packets according to the transmission rate so that the at least one wireless module consumes an amount of power approximately equal to the first power budget.

15. The system of claim 14, wherein the performance information comprises first performance information, and wherein the at least one processor is further configured to:

receive second performance information associated with the at least one wireless module; and modify the transmission rate so that the at least one wireless module consumes an amount of power associated with the second performance information.

16. The system of claim 9, wherein the at least one wireless module comprises a WiFi module, a WiGig module, and at least one of a Bluetooth module, a Near Field Communication (NFC) module, a Global Navigation Satellite System (GNSS) module, or a cellular module.

17. One or more non-transitory computer-readable media storing computer-executable instructions that, when executed by at least one processor, configure the at least one processor to perform operations comprising:

receiving performance information associated with the at least one wireless module of a wireless combo module;

determining an unutilized amount of a first power budget associated with the at least one wireless module, the determination based at least in part on the performance information; and modifying the first power budget and a second power budget associated with a second wireless module of the wireless combo module, wherein the modification comprises: (i) decreasing the first power budget by the unutilized amount and (ii) increasing the second power budget by at least a portion of the unutilized amount selecting a backoff time interval based at least in part on the first power budget; and sending a backoff according to the backoff time interval so that the at least one wireless module consumes an amount of power approximately equal to the first power budget.

18. The one or more non-transitory computer-readable media of claim 17, wherein the at least a portion of the unutilized amount comprises a first portion, and wherein the at least one processor is further configured to perform the operation comprising:

increasing a third power budget by a second portion of the unutilized amount, the third power budget associated with a third wireless module of the wireless combo module.

19. The one or more non-transitory computer-readable media of claim 17, wherein the performance information comprises first performance information, and wherein the at least one processor is further configured to perform the operations comprising:

receiving second performance information associated with the at least one wireless module; and modifying the backoff time interval so that the at least one wireless module consumes an amount of power associated with the second performance information.

20. The one or more non-transitory computer-readable media of claim 17, the at least one processor further configured to perform the operations comprising:

selecting a transmission rate for transmitting one or more data packets, the selection based at least in part on the first power budget; and sending the one or more data packets according to the transmission rate so that the at least one wireless modules consumes an amount of power approximately equal to the first power budget.

21. The one or more non-transitory computer-readable media of claim 20, the at least one processor further configured to perform the operations comprising:

receiving second performance information associated with the at least one wireless module; and modifying the transmission rate so that the at least one wireless module consumes an amount of power associated with the second performance information.

* * * * *